(12) United States Patent
Popescu (10) Patent No.: US 11,354,829 B2
(45) Date of Patent: Jun. 7, 2022

(54) MODEL-BASED IMAGE RECONSTRUCTION USING ANALYTIC MODELS LEARNED BY ARTIFICIAL NEURAL NETWORKS

(71) Applicant: Siemens Healthcare GmbH, Erlangen (DE)

(72) Inventor: Stefan Popescu, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 288 days.

(21) Appl. No.: 16/695,644

(22) Filed: Nov. 26, 2019

(65) Prior Publication Data

US 2020/0167975 A1    May 28, 2020

(30) Foreign Application Priority Data

Nov. 28, 2018   (EP) ..................... 18208830

(51) Int. Cl.
| | |
|---|---|
| *G06T 11/00* | (2006.01) |
| *G06K 9/62* | (2022.01) |
| *G06T 7/00* | (2017.01) |
| *G06T 11/60* | (2006.01) |

(52) U.S. Cl.
CPC .......... *G06T 11/005* (2013.01); *G06K 9/6256* (2013.01); *G06K 9/6262* (2013.01); *G06T 7/0002* (2013.01); *G06T 11/006* (2013.01); *G06T 11/60* (2013.01); *G06T 2207/10081* (2013.01); *G06T 2207/10088* (2013.01); *G06T 2207/20081* (2013.01); *G06T 2207/20084* (2013.01); *G06T 2207/30168* (2013.01); *G06T 2211/416* (2013.01); *G06T 2211/424* (2013.01); *G06V 2201/07* (2022.01)

(58) Field of Classification Search
CPC ... G06T 11/005; G06T 7/0002; G06T 11/006; G06T 11/60; G06T 2207/10081; G06T 2207/10088; G06T 2207/20081; G06T 2207/20084; G06T 2207/30168; G06T 2211/416; G06T 2211/424; G06K 9/6256; G06K 9/6262; G06K 2209/21
See application file for complete search history.

(56) References Cited

U.S. PATENT DOCUMENTS

| | | | |
|---|---|---|---|
| 2013/0139268 A1* | 5/2013 | An | H04L 63/1441 726/26 |
| 2017/0071562 A1* | 3/2017 | Suzuki | A61B 6/025 |
| 2019/0286850 A1* | 9/2019 | Popescu | G16H 10/60 |
| 2021/0104313 A1* | 4/2021 | Mizobe | G06N 20/00 |

(Continued)

FOREIGN PATENT DOCUMENTS

WO    WO2018045274 A1    3/2018

OTHER PUBLICATIONS

Cybenko, George. "Approximation by superpositions of a sigmoidal function." Mathematics of control, signals and systems 2.4 (1989): 303-314.

(Continued)

*Primary Examiner* — Wesley J Tucker
(74) *Attorney, Agent, or Firm* — Lempia Summerfield Katz LLC (57) ABSTRACT

The present disclosure is related to methods and systems for image reconstruction including accelerated forward transformation with an Artificial Neural Network (ANN).

18 Claims, 3 Drawing Sheets

(56) References Cited

U.S. PATENT DOCUMENTS

2021/0224997 A1* 7/2021 Kushida .................. G06T 5/001
2021/0295096 A1* 9/2021 Vu ........................ G06T 7/0002

OTHER PUBLICATIONS

European Search Report for European Patent Application No. 18208830.2-1210 dated May 10, 2019.
Marashdeh, Qussai, et al. "Nonlinear forward problem solution for electrical capacitance tomography using feed-forward neural network." IEEE Sensors Journal 6.2 (2006): 441-449.
Cohen, Ouri, Bo Zhu, and Matthew S. Rosen. "MR fingerprinting deep reconstruction network (DRONE)." Magnetic resonance in medicine 80.3 (2018): 885-894.
Hammernik, Kerstin, et al. "Learning a variational network for reconstruction of accelerated MRI data." Magnetic resonance in medicine 79.6 (2018): 3055-3071.
Yoon, Jaeyeon, et al. "Quantitative susceptibility mapping using deep neural network: QSMnet." Neuroimage 179 (2018): 199-206.
Zhang, Jian, and Bernard Ghanem. "ISTA-Net: Interpretable optimization-inspired deep network for image compressive sensing." Proceedings of the IEEE conference on computer vision and pattern recognition. 2018. pp. 1828-1837.

* cited by examiner

MODEL-BASED IMAGE RECONSTRUCTION USING ANALYTIC MODELS LEARNED BY ARTIFICIAL NEURAL NETWORKS

The present patent document claims the benefit of European Patent Application No. 18208830.2, filed Nov. 28, 2018, which is hereby incorporated by reference.

TECHNICAL FIELD

The present disclosure is related to methods and systems for image reconstruction including accelerated forward transformation with an Artificial Neural Network (ANN).

BACKGROUND

Diagnosis and therapy of patients may be based on medical images of the patients. Different imaging systems or technologies like Magnet Resonance Tomography (MRT or MR), Computer Tomography (CT), ultrasonic imaging, and many more provide for different types medical images. Each imaging technology is applicable and suitable for certain clinical questions or organs. All imaging systems use specific image reconstruction methods for providing images from raw data acquired with the respective imaging technology. The reconstruction methods assume perfect or ideal conditions. In other words, the physics behind the reconstruction methods is based on ideal conditions without any disturbances leading for example to noise in the raw data and artefacts in the image data. In particular, in MR and CT image reconstruction, the assumed ideal conditions are not present during raw data acquisition as for example the magnetic fields (base field $B_0$ and the gradient fields Gx,Gy, Gz) and the electromagnetic RF field $B_1$ of the MR scanner are not perfectly generated and may be easily disturbed. Despite over three decades of MR research, there remain challenging and intriguing problems in MR image reconstruction. The most difficult problems arise when various factors influence the measured MR signals. The reconstructed image then deviates from an ideal model (ideal conditions) or from initial assumptions based on ideal conditions made by prior art image reconstruction methods. Such influencing factors are for example, gradient non-linear effects like parasitic eddy currents, non-ideal gradient pulses with gradient offsets, the unwanted contribution of high-order modes, mode coupling and concomitant terms, etc. All these side effects introduce deviations of the actually measured trajectory in k-space (e.g., signal domain) from the expected (e.g., ideal) trajectory, leading to image artefacts. Moreover, deviations of the actual $B_0$ and $B_1$ field distributions from an ideal homogeneous model also lead to significant image artefacts. Significant $B_1+$ (that is the notation for the transmitted electromagnetic RF field) inhomogeneity inherently occurs inside the human body and it increases with the MR frequency and the magnetic field strength $B_0$. Similarly, inhomogeneous $B_0$ field distributions occur due to limitations in magnet design and magnetic susceptibility effects inside the body, generating image artefacts and geometric distortions. Further effects to be considered are the magnetization transfer and the chemical shift. In order to be able to eliminate these errors, all the non-linear and non-ideal parameters ($B_0$, $B_1$ field maps, actual gradient trajectories, etc.) influencing the MR signals may be considered in the image reconstruction method. For example, actual $B_0$ and $B_1$ field maps may be acquired before the image acquisition, the actual gradient trajectory may be measured as well in real-time and in parallel with the actual MR signals. Furthermore, accurate signal models that reflect the comprehensive physics governing the signal generation may be available as well.

For example, MR images are conventionally reconstructed from the raw data acquired directly in k-space/signal domain by a simple 2-D or 3-D Inverse Fast Fourier Transform (iFFT). However, there are a growing number of MRI applications where a simple iFFT is inappropriate, e.g., due to non-Cartesian sampling trajectories, non-Fourier physical effects, nonlinear magnetic fields or deliberate under-sampling to reduce scan time (e.g., compressed sensing MRI methods). Such considerations have led to increasing interest for model-based image reconstruction methods. Model-based iterative image reconstruction for MRI has been proposed as a way to consider the relevant physics phenomena that governs the generation of RF signals measured in MR scanners. The relevant MR physics is very well understood and may be modelled by way of the Bloch equations and Bloch simulations when considering all the factors influencing the MR signals: inhomogeneous $B_0$ and $B_1$ field distributions, real gradient trajectories and the fundamental tissue parameters T1, T2, proton density, magnetization transfer, chemical shifts, etc.

Further, in CT imaging model-based iterative image reconstruction algorithms are applied for image reconstruction. The iterative process switches multiple times back and forth between the object representation in image space or image domain and its representation in signal space/domain or data space/domain until the reconstruction eventually converges toward a final image. The forward transformation (also known as direct projection) calculates the predicted measured signals from the object image at the current iteration. The reciprocal backward transformation (also known as inverse or back projection) calculates the object image out of measured or raw signals or raw data. This inverse projection is equivalent to the prior art simple and straightforward image reconstruction. In case of MR imaging, this is the iFFT. Here, measured signals or raw data are evaluated regarding raw data prediction error by calculating the mean squared error between measured signals and predicted raw data at the current iteration. The raw data is regularized and new raw data is generated after application of a penalization term that depends on the amount of prediction error. Then, an object image at the current iteration is determined and the object image at the current iteration is evaluated to meet the quality criteria. The new image is compared to the previous image at last iteration. If the quality criteria are met, then the iteration stops. If not, then the current image is regularized into a new penalized image. The penalization term depends on the amount of error detected.

Model-based iterative image reconstruction in MR imaging is very much time consuming. This problem arises because for each iteration act the reconstruction method needs to solve the forward projection problem, which is to calculate the expected MR signals when all the influencing factors are known. Because there is no general analytic solution for the Bloch equations, the forward problem in MR imaging may only be solved by time and computing resource demanding Bloch simulations. This limitation impedes a large-scale clinical deployment of the powerful model-based image reconstruction in MR imaging. The prior art method known as MR Fingerprinting (MRF) partially solves this problem by way of offline Bloch simulations used to build a refined but also large dictionary of MR signals as resulted by combination of subsets of input parameters (e.g., T1, T2, and proton density). However, when adding multiple influencing factors (e.g., only the $B_0$ and $B_1$ field maps) the size of this dictionary becomes prohibitively large to be stored in a computer memory and the search and matching time required to fit a measured signal onto a particular dictionary entry becomes too long while the signal fitting becomes unreliable. Further image reconstruction methods are using pre-trained ANN. However, these methods claim generally a non-iterative (one-shot) direct (end-to-end transformation) from signal domain into the image domain by a well-trained ANN architecture. However, this approach (in spite of being very fast compared to iterative image reconstruction methods) misses the power of applying iterative corrections/penalizations to the current image with the goal to successively improve the quality and the accuracy of the final image.

It is therefore a yet unmet need to further improve the image reconstruction in medical imaging.

SUMMARY AND DESCRIPTION

The objective for improved image reconstruction in medical imaging is achieved by the methods, systems, and imaging devices disclosed herein.

The scope of the present disclosure is defined solely by the appended claims and is not affected to any degree by the statements within this summary. The present embodiments may obviate one or more of the drawbacks or limitations in the related art.

According to a first aspect, a method of image reconstruction includes the recursive acts of: A) Checking whether image data suffices predefined quality criteria and in case the image data did not suffice the predefined quality criteria continuing with act C); C) Generating predicted signal data based on the image data by accelerated forward transformation with an Artificial Neural Network (ANN) trained on providing an estimation for a solution of signal evolution equations; and D) Changing the image data in a signal domain and/or an image domain based on the predicted signal data and raw data received from an imaging device and continuing with act A).

According to a second aspect, a system for image reconstruction is arranged and configured for implementing the method according to the first aspect. The system includes a reconstruction controller, an Artificial Neuronal Network (ANN) and an image changing module. The reconstruction controller is arranged and configured for checking whether image data suffices predefined quality criteria. The ANN is trained on providing an estimation for a solution of signal evolution equations. The ANN is arranged and configured for generating predicted signal data by accelerated forward transformation based on the image data in case the image data did not suffice the predefined quality criteria. The image changing module is arranged and configured for changing the image data in a signal domain and/or an image domain based on the predicted signal data and raw data received from an imaging device.

According to a third aspect, an imaging device includes the system according to the second aspect.

The raw data may be provided by the (e.g., medical) imaging device (e.g., a Magnet Resonance Tomography (MRT or MR) scanner, a Computer Tomography (CT) scanner, etc.). The image data firstly generated from the provided raw data. In each iteration of the method the (e.g., current) image data is checked against the predefined quality criteria. In case the image data and the respective (e.g., medical) image are of such high quality that the predetermined quality criteria are met, the iteration is aborted. However, in case the image data is of insufficient quality such that the predetermined quality criteria are not met, the iteration is not aborted and the next act [e.g., act C) or act B) of a refinement of the present disclosure described later] is executed.

If the iteration is continued, the image data is provided to the trained ANN for accelerated forward transformation. The ANN is trained such that it generates a solution of signal evolution equations like the Bloch equations in MR imaging. Instead of time-consuming and computationally intensive solving of signal evolution equations (e.g., in a Bloch simulation) a fast and direct forward transformation of the image data into predicted signal data is effected. Thus, the trained ANN generates predicted signal data based on the provided image data in a fast and efficient way. The predicted signal data resemble signal data a corresponding (e.g., medical) imaging device would have generated in a hypothetical imaging scenario under ideal conditions with the provided image data as image data resulting in the hypothetical imaging scenario under ideal conditions. For example, the signal data or raw data in MR imaging correspond to a spin distribution in the target (e.g., body part of the patient).

After the predicted signal data have been generated by the trained ANN, the (e.g., current) image data of the current iteration is changed based on the predicted signal data and the raw data. This changing may be executed via adapting in the signal domain (e.g., k-space in MR imaging) and additionally or alternatively via adjusting in the image domain.

Then the next iteration is started and the changed (e.g., adapted and/or adjusted) image data is checked against the predefined quality criteria in act A).

Using accelerated forward transformation by the trained ANN significantly speeds up transformation of image data into predicted signal data. Therefore, the iterative image reconstruction method (e.g., in the signal domain and/or the image domain) may be implemented and executed in a fast and efficient way. This provides for fast and yet high-quality image reconstruction for different (e.g., medical) imaging technologies like MR imaging or Ct imaging.

According to a refinement of the present disclosure, act D) includes the acts of: D1) calculating a first cost value based on the predicted signal data and the raw data in the signal domain; D2) adapting the predicted signal data based on the first cost value in the signal domain; D3) reconstructing image data based on the adapted predicted signal data.

According to a further refinement, the image changing module is further arranged and configured for implementing the acts D1) to D3).

After the predicted signal data was generated by the trained ANN in act B) the first cost value is calculated in the signal domain (e.g., k-space for MR imaging) with respect to the raw data and the predicted signal data. Thus, the predicted signal data for the hypothetical imaging scenario is compared to the really acquired raw data. The first cost value ($C_1$) may be calculated according to the following equation:

$$C_1 = \|D_{pre} - D_{raw}\|_2 + \alpha_1 P_1(I) + \beta_1 P_2(D_{pre})$$

In the above equation, $D_{pre}$ is the predicted signal data, $D_{raw}$ is the raw data, $P_1$ and $P_2$ are predefined penalty functions (known from prior art), $\alpha_1$ and $\beta_1$ are parameters for controlling the corresponding amounts of penalization (e.g., experimentally fine-tuned to meet the predefined image quality criteria), I is the (e.g., current) image data and $\| \|_2$ is the L2-norm.

Then the predicted signal data is adapted in the signal domain based on the first cost value. The adapted predicted signal data ($D_{adapt}$) may be calculated according to the following equation:

$$D_{adapt} = D_{pre} - \gamma_1 \nabla C_1$$

In this equation, $\gamma_1$ is a factor for controlling the speed and the stability (e.g., convergence) of the iterative process and $\nabla$ is the gradient.

Finally, the image data for the next iteration is reconstructed from the adapted predicted signal data by a regular reconstruction algorithm/method (e.g., back projection for CT imaging or iFFT for MR imaging).

Adapting the predicted signal data in the signal domain provides for fast convergence of the iterative image reconstruction.

According to a refinement of the present disclosure, act D) alternatively or additionally includes the acts of: D4) calculating a second cost value ($C_2$) based on the predicted signal data and the raw data; and D5) adjusting the image data based on the second cost value in the image domain.

According to a further refinement, the image changing module is further arranged and configured for implementing the acts D4) to D5).

After the predicted signal data was generated by the trained ANN in act B), the second cost value is calculated with respect to the raw data and the predicted signal data. Thus, the predicted signal data for the hypothetical imaging scenario is compared to the really acquired raw data. The second cost value ($C_2$) may be calculated according to the following equation:

$$C_2 = \|D_{pre} - D_{raw}\|_2 + \alpha_2 P_1(I) + \beta_2 P_2(D_{pre})$$

In this equation, $D_{pre}$ is the predicted signal data, $D_{raw}$ is the raw data, $P_1$ and $P_2$ are predefined penalty functions (known from prior art), $\alpha_2$ and $\beta_2$ are parameters for controlling the corresponding amounts of penalization (e.g., experimentally fine-tuned to meet the predefined image quality criteria), I is the (e.g., current) image data and $\| \|_2$ is the L2-norm.

Then the image data of the current iteration ($I_n$) is adjusted in the image domain based on the second cost value. The resulting image data for the next iteration ($I_{n+1}$) may be calculated according to the following equation:

$$I_{n+1} = I_n - \gamma_2 \nabla C_2$$

In this equation, $\gamma_2$ is a factor for controlling speed and the stability (e.g., convergence) of the iterative process and $\nabla$ is the gradient.

According to a refinement, the method further includes an initial act of: generating initial image data based on the received raw data from the imaging device before the recursive act A).

According to a further refinement, the reconstruction controller is further arranged and configured for implementing the act of generating initial image data based on the received raw data from the imaging device before the recursive act A).

Before the iterative acts of the method are executed, the initial image data is created by reconstructing the initial image data based on the raw data by a regular reconstruction algorithm/method (e.g., back projection for CT imaging or iFFT for MR imaging).

Starting the iterative acts with the initial image data provides for particularly fast convergence as no arbitrary image data is used.

According to a refinement, the method further includes a final act after the recursive act A) of outputting the image data when the image data does suffice the quality criteria in act A).

According to a further refinement, the reconstruction controller is further arranged and configured for implementing the act of outputting the image data when the image data does suffice the quality criteria in act A).

In case the image data is of sufficient quality and the predefined quality criteria are met in act A), the image data is output, e.g., for displaying the corresponding image to a user on a display or for printing the corresponding image.

According to a refinement, the method further includes an act of: B) regularizing the image data after act A) in case the image data did not suffice the predefined quality criteria.

In act C), the predicted signal data is generated based on the regularized image data.

According to a further refinement, the reconstruction controller is further arranged and configured for implementing the act of: B) regularizing the image data after act A) in case the image data did not suffice the predefined quality criteria.

In act C), the predicted signal data is generated based on the regularized image data.

Regularizing the image data may include edge-preserving filtering. The regularizing may also model physical noise effects (e.g., amplitude, direction, correlations, etc.). Further, the regularizing may reduce noise while preserving edges. Finally, the regularizing may include empirical corrections. Thus, regularizing provides for fewer artefacts in the regularized image data.

With regularizing the image data, the predefined quality criteria may be met faster in the next iterations due to the reduced amount of artefacts in the regularized image data.

According to a refinement, the method further includes an act of: E) adapting the raw data into error-corrected raw data based on the first cost value ($C_1$) after act D1) providing for minimizing an error in the raw data due to specific conditions during image acquisition with the imaging device.

In act D1) of a next iteration, the then predicted signal data is compared to the adapted raw data.

According to a further refinement, the reconstruction controller is further arranged and configured for implementing the act of: E) adapting the raw data into error-corrected raw data based on the first cost value ($C_1$) after act D1) providing for minimizing an error in the raw data due to specific conditions during image acquisition with the imaging device.

In act D1) of a next iteration, the then predicted signal data is compared to the adapted raw data.

This comparison between the then predicted signal data of the next iteration and the adapted raw data is implemented as the first term in the cost function. This is also known as the "DATA FIDELITY" term. It is the L2-norm of the difference. Thus, the effect is than by minimizing the cost, this difference is implicitly minimized.

According to a refinement, the act D3) of reconstructing the image data based on the error-corrected raw data and/or the adapted predicted signal data is effected by a second ANN trained on fast image reconstruction from the error-corrected raw data and/or the adapted predicted signal data.

According to a further refinement, the system further includes a second ANN trained on fast image reconstruction from the error-corrected raw data and/or the adapted predicted signal data and arranged and configured for effecting the act D3) of reconstructing the image data based on the error-corrected raw data and/or the adapted predicted signal data.

The image reconstruction in act D3) is be also implemented using a trained ANN. Unlike known from prior art, the second ANN is further trained to use additional input data provided by the respective imaging device, for example, like field maps and actual gradient trajectory of the imaging device, in order to generate more accurate (e.g., initial) image data.

Using a second ANN trained on fast image reconstruction, the reconstruction of the image data for the next iteration may be significantly sped up but also the accuracy of the image data may be increased.

According to a refinement, the act D3) of reconstructing the image data based on the adapted predicted signal data is effected by accelerated Bloch simulations readjusting the predicted signal returned by the ANN in act C) to eliminate gradient trajectory errors and field inhomogeneity and wherein a iFFT is used for reconstructing the image data.

According to a further refinement, the image changing module is further arranged and configured for effecting the act D3) by accelerated Bloch simulations readjusting the predicted signal returned by the ANN in act C) to eliminate gradient trajectory errors and field inhomogeneity and wherein a iFFT is used for reconstructing the image data.

Accelerated Bloch simulations are used in order to generate a new k-space data block at each iteration that will be corrected for non-linear and non-ideal effects. That is, at act C) the predicted signal data (e.g., synthetic k-space) returned by the ANN (e.g., direct projector) is readjusted to eliminate the gradient trajectory errors and the field inhomogeneity. After this processing act, the new predicted signal data (e.g., adjusted MR signals) corresponds to a virtual scanner with no errors (e.g., either in gradient trajectory or in field distributions) and in consequence a fast standard iFFT may be used for image reconstruction in act D3).

The accelerated Bloch simulations provide for a more precise and faster image reconstruction in each iteration.

According to a refinement, in the act D3), resampling is performed on the adapted predicted signal data before reconstructing the image data.

According to a further refinement, the image changing module is further arranged and configured for performing resampling on the adapted predicted signal data before reconstructing the image data in the act D3).

Data resampling methods (e.g. the well-known regridding method in MR imaging or rebinning method in CT imaging) are used to convert the distribution of the initially measured raw data and/or of the predicted signal data into a domain specific distribution that best suits a fast and standard backward transformation in act D3), that is from the signal domain into the image domain. Such fast back projectors are, for example, the iFFT for MR imaging and the filtered back-projection method for CT imaging. As a particular example for MR imaging, the k-space data may be initially collected using a radial trajectory. Then regridding is used to convert the radial distribution of samples into a Cartesian distribution that better suits the iFFT.

The resampling provides for faster data conversion (e.g., image reconstruction) from signal domain into image domain.

According to a refinement, the method further includes the recursive prior training acts of: t1) calculating provisional predicted signal data corresponding to a set of training image data from a multitude of sets of training image data and by using values of internal connection weights of the ANN at the current iteration; t2) calculating a deviation between the provisional predicted signal data and a set of training signal data for a multitude of sets of training signal data corresponding to the set of training image data in act t1); t3) checking whether the deviation is equal to or smaller than a predefined abort criterion; t4) readjusting the values of the internal connection weights based on the deviation in case the deviation is not equal to or smaller than a predefined abort criterion in act t4); and continuing with act t1).

The training acts t1) to t4) may also define a completely separate training method, which is not depending on the subsequent acts of the method according to the second aspect.

According to a further refinement, the ANN was trained based on the acts t1) to t4).

Training the ANN to provide a fast estimation for the solution of Bloch equations effected with a back-propagation method. The set of training image data is provided to an unlearned ANN. The ANN calculates the provisional predicted signal data based on the provided set of training image data by using the values of the internal connection weights of the ANN at the current iteration. Then the deviation (e.g., root mean squared prediction error) between the provisional predicted signal data (e.g., predicted output values) and a set of training signal data corresponding to the set of training image data in act t1) (e.g., the known solution values at all discretization points) is calculated. The deviation is compared to a predefined abort criterion for the training iteration. The values of the internal connection weights are readjusted based on the deviation in case the deviation is not equal to or smaller than the predefined abort criterion in act t3) and continuing with act t1).

There are various back propagation algorithms such as Scaled Conjugate Gradient (SCG), Levenberg-Marquardt (LM), and Resilient back Propagation (RP). LM is the fastest training algorithm for networks of moderate size and it has the memory reduction feature to be used when the training set is large. As a particular example, an ANN with a single hidden layer having 20 nodes and an output layer with 2 nodes to predict the predicted signal data (e.g., magnitude and phase of MR signal) emerging from one voxel would need a few thousands of training sets. A training set starts with available gridded distributions of T1, T2 and proton densities values exercised by a known magnetic field distribution (e.g., $B_0$ map) and a standard MR sequences (e.g., $B_1$ and Gradients) and being completed by prior art Bloch simulations.

According to a refinement, the method further includes an initial training act of initializing the internal connection weights of the ANN with non-zero values before the recursive act t1).

According to a further refinement, the ANN was further trained based on the act of initializing the internal connection weights of the ANN with non-zero values before the recursive act t1).

With initialization of the internal weights of the ANN at certain non-zero values the training of the ANN may be significantly sped up or rather be executed at all because the training will not work at all (e.g., no convergence will be achieved) if these weights are initialized with all zero values.

According to a refinement, the method further includes the initial training acts of: providing the multitude of sets of training image data; initializing a discretization grid; calculating a set of training signal data for each set of training image data; and storing the set of training signal data together with the respective set of training image data before the recursive act t1).

According to a further refinement, the ANN was trained based on the acts of: providing the multitude of sets of training image data; initializing a discretization grid; calculating a set of training signal data for each set of training image data; and storing the set of training signal data together with the respective set of training image data before the recursive act t1).

After the multitude of sets of training image data is provided and the discretization grid is initialized, the sets of training signal data are calculated by running Bloch simulations for each set of training image data in order to generate the respective set of training signal data. The calculated sets of (exact) training signal data are stored with the corresponding sets of training image data for the following recursive training acts t1) to t4). An exemplary discretization grid for MR imaging is listed below:

| Input Parameter | Range of values | Discretization act |
| --- | --- | --- |
| T1 | 1 . . . 4000 ms | 2 ms |
| T2 | 1 . . . 2500 ms | 5 ms |
| Δbo | −100 . . . 100 ppm | 5 ppm |
| B1 | 0 . . . 2 µT | 0.01 µT |
| Gx, Gy, Gz, . . . | −40 . . . 40 mT | 0.1 mT |

The sets of exact training signal data have to be calculated (e.g., simulated with a Bloch model) only once for training multiple ANNs. This significantly reduces the time and computing capacity needed for training ANNs having different architecture (e.g., number of hidden layers and number of nodes per layer) or for retraining the ANNs using various backpropagation methods.

BRIEF DESCRIPTION OF THE DRAWINGS

The present disclosure and its technical field are subsequently explained in further detail by exemplary embodiments shown in the drawings. The exemplary embodiments provide better understanding of the present disclosure and in no case are to be construed as limiting for the scope of the present disclosure. Particularly, it is possible to extract aspects of the subject-matter described in the figures and to combine it with other components and findings of the present description or figures, if not explicitly described differently. Equal reference signs refer to the same objects, such that explanations from other figures may be supplementally used.

DETAILED DESCRIPTION

Figure 1:
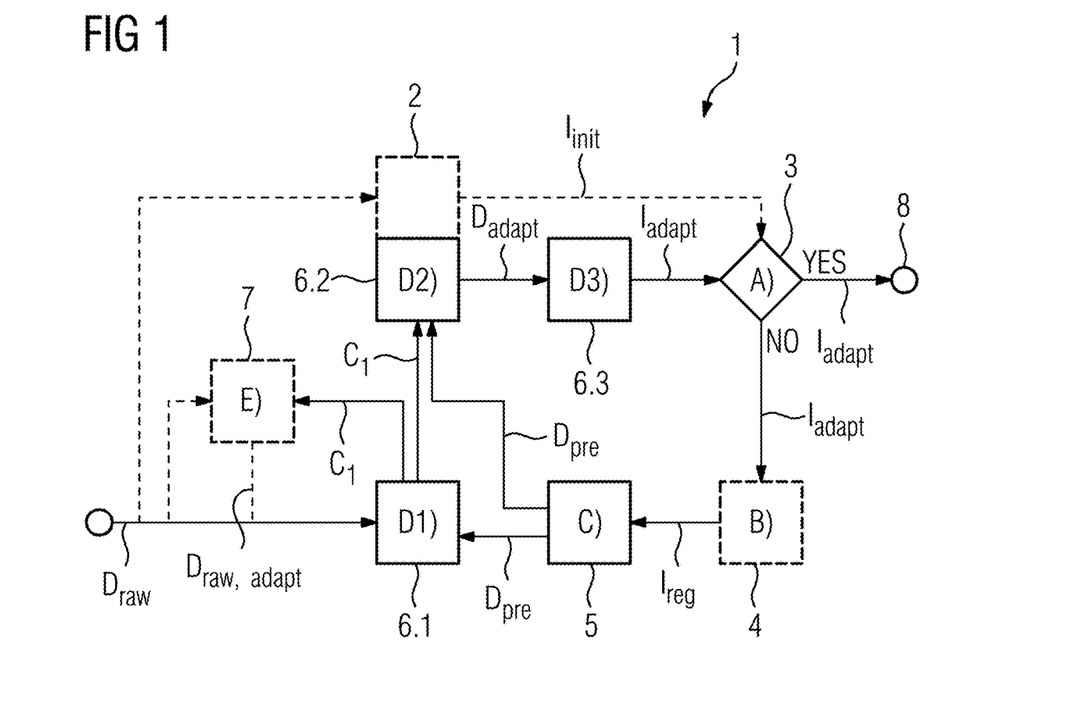
FIG. 1 depicts a schematic flow chart of a first embodiment of the method.

In FIG. 1, a flow chart of a first embodiment of a method 1 of image reconstruction is schematically depicted. The method 1 includes an optional initial act of generating 2 initial image data $I_{init}$, a recursive act A) of checking 3, an optional recursive act B) of regularizing 4, a recursive act C) of generating predicted signal data, an act D1) of calculating 6.1 a first cost value $C_1$, a recursive act D2) of adapting 6.2, a recursive act D3) of reconstructing 6.3 image data $I_{adapt}$, an optional recursive act E) of adapting 7 the raw data $D_{raw}$ and an optional final act of outputting 8.

First in the act of generating 2 initial image data $I_{init}$ is generated based on the received raw data $D_{raw}$ from the imaging device. Then in act A) of checking 3 it is checked whether image data $I_{adapt}$, $I_{init}$ suffices predefined quality criteria Q. Only during first execution of the act A) the initial image data $I_{init}$ is checked. In the following iterations reconstructed image data $I_{adapt}$ is checked. In case the image data $I_{adapt}$, $I_{init}$ did not suffice the predefined quality criteria Q continuing with act B) of regularizing 4.

The image data $I_{adapt}$, $I_{init}$ is regularized in the act B) of regularizing 4 via edge-preserving filtering and/or modelling physical noise effects and/or reducing noise while preserving edges and/or empirical corrections.

In the following act C) of generating 5 predicted signal data $D_{pre}$ is generated based on the regularized image data $I_{reg}$ by accelerated forward transformation with an Artificial Neural Network (ANN). The ANN is trained on providing an estimation for a solution of signal evolution equations like the Bloch equations for MR imaging.

The predicted signal data $D_{pre}$ is used together with the raw data $D_{raw}$, $D_{raw,adapt}$ in the act D1) of calculating 6.1 the first cost value $C_1$ for calculating the latter in the signal domain with the following equation:

$$C_1 = \|D_{pre} - D_{raw}\|_2 + \alpha_1 P_1(I) + \beta_1 P_2(D_{pre})$$

In this equation, $P_1$ and $P_2$ are predefined penalty functions (known from prior art), $\alpha_1$ and $\beta_1$ are parameters for controlling the corresponding amounts of penalization (e.g., experimentally fine-tuned to meet the predefined image quality criteria), I is the (e.g., current) image data ( ) and $\| \|_2$ is the L2-norm.

In the act E) of adapting 7 the raw data $D_{raw}$ is adapted into error-corrected raw data $D_{raw,adapt}$ based on the first cost value $C_1$ after act D1). This provides for minimizing an error in the raw data $D_{raw}$ due to specific conditions during image acquisition with the imaging device. In the act D1) of calculating 6.1 of the next iteration (n+1) the then predicted signal data $D_{pre}$ is compared to the adapted raw data $D_{raw,adapt}$.

Next, in the act D2) of adapting 6.2 the predicted signal data $D_{pre}$ is adapted based on the first cost value $C_1$ in the signal domain according to the following equation:

$$D_{adapt} = D_{pre} - \gamma_1 \nabla C_1$$

In this equation, $\gamma_1$ is a factor for controlling the speed and stability (convergence) of the iterative process and $\nabla$ is the gradient.

The adapted predicted signal data $D_{adapt}$ is used in act D3) of reconstructing 6.3 where the image data $I_{adapt}$ for the next iteration (n+1) is reconstructed. The act D3) can be effected by a second ANN trained on fast image reconstruction from the error-corrected raw data $D_{raw,adapt}$ or by accelerated Bloch simulations readjusting the predicted signal returned by the ANN in the act C) to eliminate gradient trajectory errors and field inhomogeneity and wherein a FFT is used for reconstructing the image data $I_{adapt}$. Additionally, or alternatively, in the act D3), resampling is performed on the adapted predicted signal data $D_{adapt}$ before reconstructing the image data $I_{adapt}$.

As soon as the image quality criteria in the act A) of a subsequent iteration (n+1) are met by the reconstructed image data $I_{adapt}$ (or already by the initial image data $I_{init}$)

the iteration is aborted and the act of outputting 8 is executed where the image data $I_{adapt}$ (or $I_{init}$) is output for example to a printer or a display.

Figure 2:
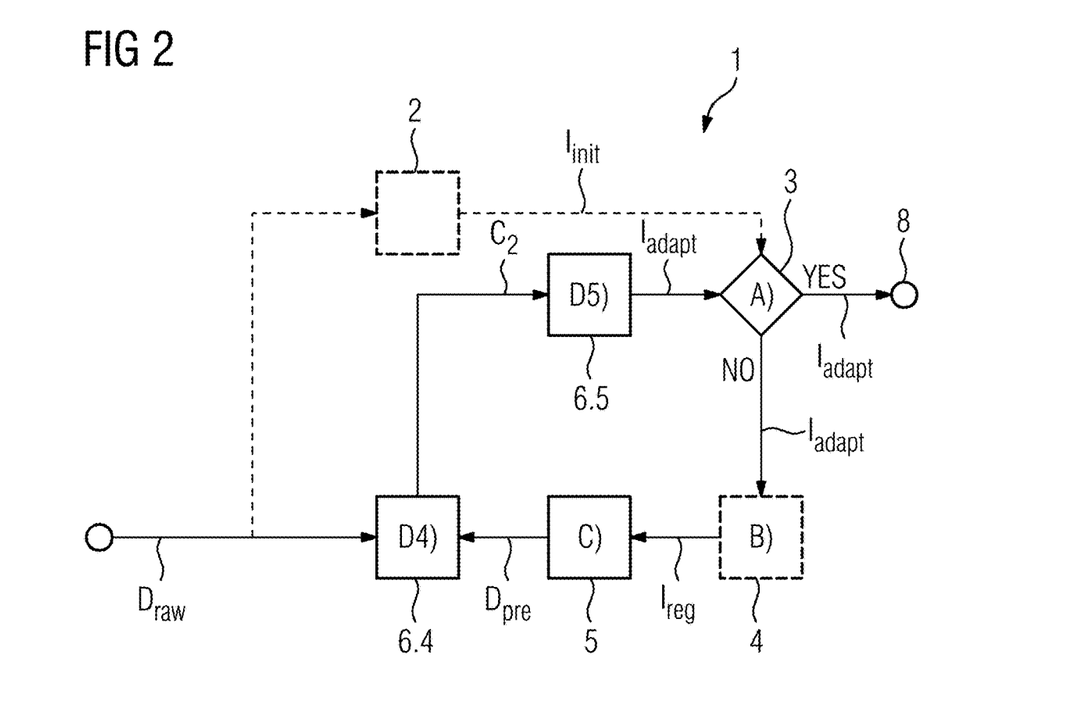
FIG. 2 depicts a schematic flow chart of a second embodiment of the method.

In FIG. 2, a flow chart of a second embodiment of the method of image reconstruction is schematically depicted. In the following only the differences to the first embodiment according to FIG. 1 are described. After the act C) of generating 5 an act D4) of calculating 4 a second cost value $C_2$ and an act D5) of adjusting 6.5 the image data $I_{reg}$ are executed instead of the acts D1) to D3) and E).

In the act D4) of calculating 4 the second cost value $C_2$ is calculated with the following equation:

$$C_2 = \|D_{pre} - D_{raw}\|_2 + \alpha_2 P_1(I) + \beta_2 P_2(D_{pre})$$

In this equation, $\alpha_2$ and $\beta_2$ are parameters for controlling the corresponding amounts of penalization (e.g., experimentally fine-tuned to meet the predefined image quality criteria).

In the following act D5) of adjusting 6.5 the image data $I_{adapt}$, $I_{init}$, $I_{reg}$ is adjusted based on the second cost value $C_2$ in the image domain according to the following equation:

$$I_{n+1} = I_n - \gamma_2 \nabla C_2$$

In this equation, $I_{n+1}$ is the image data for the following iteration (n+1), $\gamma_2$ is a factor for controlling the speed and stability (e.g., convergence) of the iterative process and $\nabla$ is the gradient.

Figure 3:
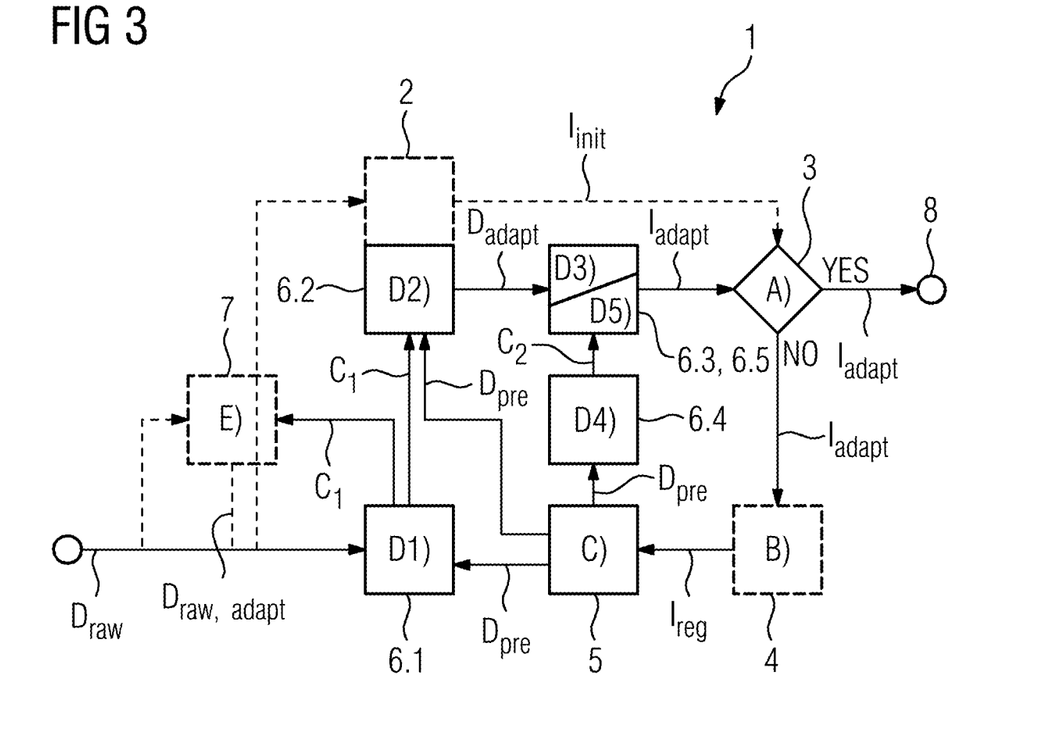
FIG. 3 depicts a schematic flow chart of a third embodiment of the method.

In FIG. 3, a flow chart of a third embodiment of the method of image reconstruction is schematically depicted. In the following, only the differences to the first embodiment and the second embodiment according to FIG. 1 and FIG. 2, respectively, are described. After the act C) of generating 5 the act D4) of calculating 4 the second cost value $C_2$ and the act D5) of adjusting 6.5 the image data $I_{reg}$ are executed additionally to the acts D1) to D3) and E).

Here, the act D3) of reconstructing 6.3 is executed together with the act D5) of adjusting 6.5 such that the reconstructed image data $I_{adapt}$ of the act D3) derived from the adapted predicted signal data $D_{adapt}$ that was adapted with the first cost value $C_1$ in the signal domain in the acts D1) and D2) is additionally adjusted in the image domain by the act D5) with the second cost value $C_2$.

Figure 4:
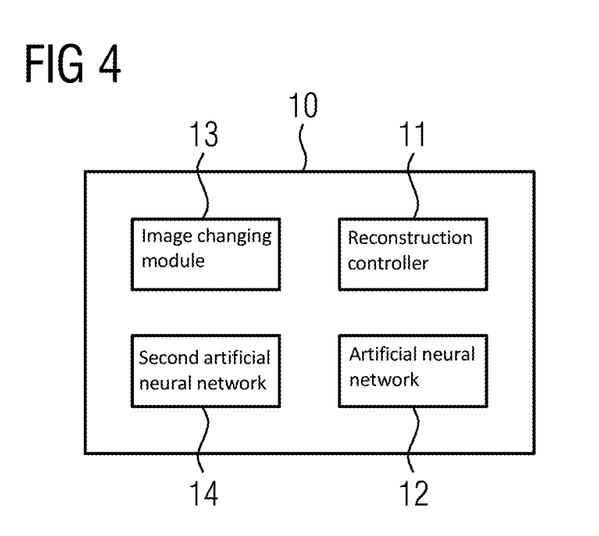
FIG. 4 depicts a schematic view of an example of a system.

In FIG. 4, a view of a system 10 for image reconstruction is schematically depicted. The system 10 includes a reconstruction controller 11, an ANN 12, an image changing module 13 and a second ANN 14. The system 10 and its components 11, 12, 13, 14 are arranged and configured for implementing and executing the method of reconstructing image data according to FIG. 1 and/or FIG. 2 and/or FIG. 3.

Figure 5:
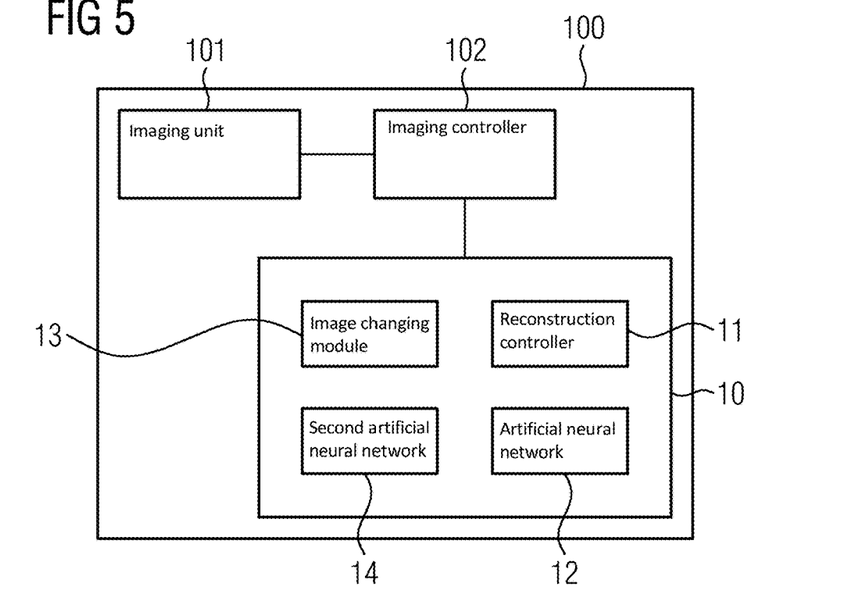
FIG. 5 depicts a schematic view of an example of imaging device.

In FIG. 5, a view of an imaging device 100 including the system 10 for image reconstruction of FIG. 4 is schematically depicted. An imaging unit 101 of the imaging device 100 is arranged and configured for acquiring raw data from a target like a body part of a patient. An imaging controller 102 of the imaging device 100 is arranged and configured for controlling the imaging unit 101 and the system 10.

Figure 6:
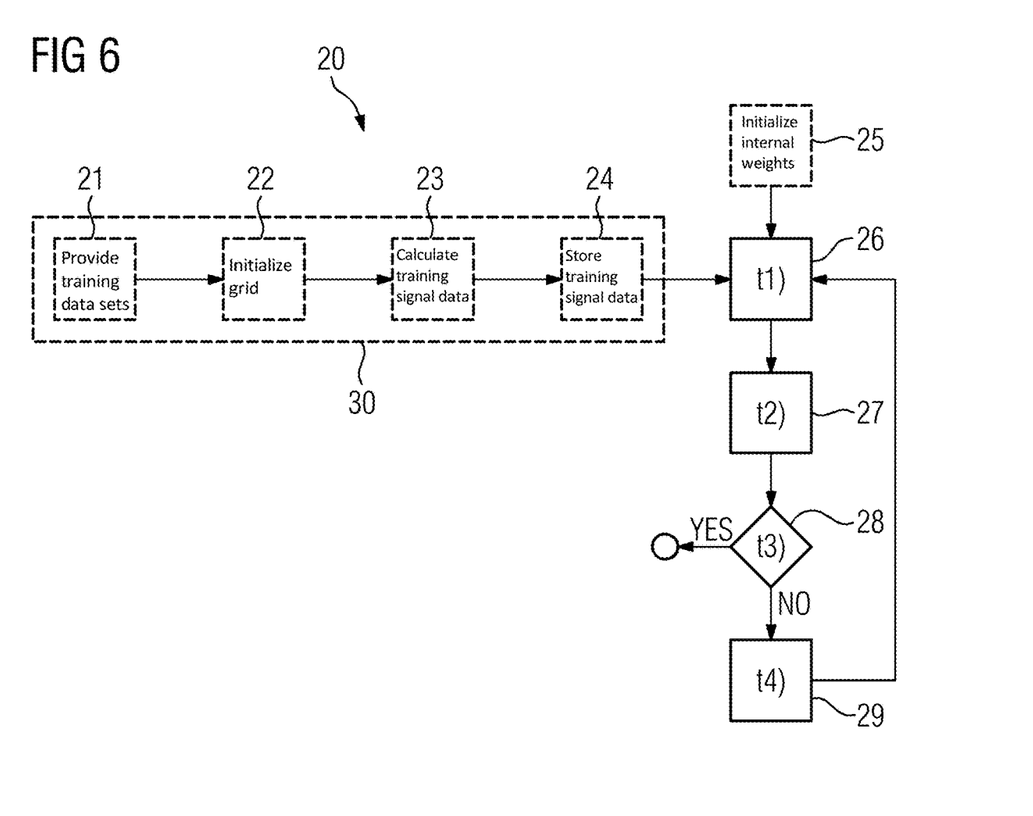
FIG. 6 depicts a schematic flow chart of an example of a training method for an Artificial Neural Network (ANN).

In FIG. 6, a flow chart of a training method 20 for an ANN 12 is schematically depicted. The training method 20 includes an optional initial act of providing 21 a multitude of sets of training image data, an optional initial act of initializing 22 a discretization grid, an optional initial act of calculating 23 a set of training signal data for each set of training image data and an optional initial act of storing 24 the set of training signal data together with the respective set of training image data. Additionally, the training method 20 further includes an optional initial act of initializing 25 internal connection weights of the ANN 12 with non-zero values. After the optional initial acts the actual training of the ANN 12 with the following recursive acts starts: an act t1) of calculating 26 provisional predicted signal data corresponding to a set of training image data from a multitude of sets of training image data and by using values of internal connection weights of the ANN 12 at the current iteration (N); subsequent act t2) of calculating 27 a deviation between the provisional predicted signal data and a set of training signal data for a multitude of sets of training signal data corresponding to the set of training image data in act t1); subsequent act t3) of checking 28 whether the deviation is equal to or smaller than a predefined abort criterion; and finally act t4) of readjusting 29 the values of the internal connection weights based on the deviation in case the deviation is not equal to or smaller than the predefined abort criterion in act t3) and continuing with act t1). If the abort criterion is fulfilled, the training iteration is aborted, and the ANN 12 is completely trained and ready for operation in the system 10.

The acts 21 to 24 may be a separate method of providing training data for training the ANN 12.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this disclosure is intended to cover any adaptations or variations of the specific embodiments discussed herein.

In the foregoing detailed description, various features are grouped together in one or more examples for the purpose of streamlining the disclosure. It is understood that the above description is intended to be illustrative, and not restrictive. It is intended to cover all alternatives, modifications and equivalents as may be included within the scope of the disclosure. Many other examples will be apparent to one skilled in the art upon reviewing the above specification.

Specific nomenclature used in the foregoing specification is used to provide a thorough understanding of the disclosure. However, it will be apparent to one skilled in the art in light of the specification provided herein that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed; many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be understood as including ("and/or") and not exclusive ("either . . . or").

The invention claimed is:

1. A method of image reconstruction, the method comprising recursive acts of:
   A) checking whether image data suffices predefined quality criteria, and when the image data does not suffice the predefined quality criteria, continuing with act C);
   C) generating predicted signal data based on the image data by accelerated forward transformation with an Artificial Neural Network (ANN) trained on providing an estimation for a solution of signal evolution equations;
   D) changing the image data in a signal domain and/or an image domain based on the predicted signal data and raw data received from an imaging device, wherein the changing of the image data comprises the acts of: D1) calculating a first cost value based on the predicted signal data and the raw data in the signal domain; D2) adapting the predicted signal data based on the first cost value in the signal domain; and D3) reconstructing image data based on the adapted predicted signal data; and
   continuing with act A).

2. The method of claim 1, wherein act D) further comprises the acts of:
   D4) calculating a second cost value based on the predicted signal data and the raw data; and
   D5) adjusting the image data based on the second cost value in the image domain.

3. The method of claim 1, further comprising, prior to recursive act A), an initial act of:
   generating initial image data based on the received raw data from the imaging device.

4. The method of claim 1, further comprising, after the recursive act A), a final act of:
   outputting the image data when the image data does suffice the quality criteria in act A).

5. The method of claim 1, further comprising an act of:
   B) regularizing the image data after act A) when the image data does not suffice the predefined quality criteria,
   wherein, in act C), the predicted signal data is generated based on the regularized image data.

6. The method of claim 1, further comprising an act of:
   E) adapting the raw data into error-corrected raw data based on the first cost value after act D1) providing for minimizing an error in the raw data due to specific conditions during image acquisition with the imaging device,
   wherein, in act D1) of a next iteration, the predicted signal data is compared to the adapted raw data.

7. The method of claim 6, wherein the act D3) of reconstructing the image data based on the error-corrected raw data and/or the adapted predicted signal data is effected by a second ANN trained on fast image reconstruction from the error-corrected raw data and/or the adapted predicted signal data.

8. The method of claim 1, wherein the act D3) of reconstructing the image data based on the adapted predicted signal data is effected by accelerated Bloch simulations readjusting the predicted signal returned by the ANN in act C) to eliminate gradient trajectory errors and field inhomogeneity and wherein an inverse Fast Fourier Transform (iFFT) is used for reconstructing the image data.

9. The method of claim 1, wherein, in the act D3), resampling is performed on the adapted predicted signal data before reconstructing the image data.

10. A method of image reconstruction, the method comprising recursive acts of:
    A) checking whether image data suffices predefined quality criteria, and when the image data does not suffice the predefined quality criteria, continuing with act C);
    C) generating predicted signal data based on the image data by accelerated forward transformation with an Artificial Neural Network (ANN) trained on providing an estimation for a solution of signal evolution equations;
    D) changing the image data in a signal domain and/or an image domain based on the predicted signal data and raw data received from an imaging device; and
    continuing with act A),
    wherein the ANN is trained via recursive training acts comprising:
    t1) calculating provisional predicted signal data corresponding to a set of training image data from a multitude of sets of training image data and by using values of internal connection weights of the ANN at a current iteration;
    t2) calculating a deviation between the provisional predicted signal data and a set of training signal data for a multitude of sets of training signal data corresponding to the set of training image data in act t1);
    t3) checking whether the deviation is equal to or smaller than a predefined abort criterion;
    t4) readjusting the values of the internal connection weights based on the deviation in case the deviation is not equal to or smaller than the predefined abort criterion in act t3); and
    continuing with act t1).

11. The method of claim 10, further comprising, prior to the recursive training act t1), an initial training act of:
    initializing the internal connection weights of the ANN with non-zero values.

12. The method of claim 10, further comprising, prior to the recursive training act t1), initial training acts of:
    providing the multitude of sets of training image data;
    initializing a discretization grid;
    calculating a set of training signal data for each set of training image data; and
    storing the set of training signal data together with the respective set of training image data.

13. A system for image reconstruction, the system comprising:
    a reconstruction controller configured to check whether image data suffices predefined quality criteria;
    an Artificial Neuronal Network (ANN) trained on providing an estimation for a solution of signal evolution equations configured to generate predicted signal data by accelerated forward transformation based on the image data when the image data does not suffice the predefined quality criteria; and
    an image changing module configured to change the image data in a signal domain and/or an image domain based on the predicted signal data and raw data received from an imaging device, wherein the change of the image data comprises a calculation of a first cost value based on the predicted signal data and the raw data in the signal domain; an adaption of the predicted signal data based on the first cost value in the signal domain; and a reconstruction of the image data based on the adapted predicted signal data, wherein the system is configured to recursively use the reconstruction controller, ANN, and image changing module until the image data suffices the predefined quality criteria.

14. The system of claim 4, wherein the image changing module is further configured to change the image data by:
a calculation of a second cost value based on the predicted signal data and the raw data; and
an adjustment of the image data based on the second cost value in the image domain.

15. The system of claim 13, wherein the reconstruction controller is further configured to, prior to checking whether the image data suffices the predefined quality criteria:
generate initial image data based on the received raw data from the imaging device.

16. The system of claim 4, further comprising:
a second ANN trained on fast image reconstruction from error-corrected raw data and/or the adapted predicted signal data,
wherein the second ANN is configured to effect the reconstruction of the image data based on the error-corrected raw data and/or the adapted predicted signal data.

17. The system of claim 13, wherein the ANN is configured to be trained by:
a calculation of a provisional predicted signal data corresponding to a set of training image data from a multitude of sets of training image data and by using values of internal connection weights of the ANN at a current iteration;
a calculation of a deviation between the provisional predicted signal data and a set of training signal data for a multitude of sets of training signal data corresponding to the set of training image data in the calculation of the provisional predicted signal data;
a check on whether the deviation is equal to or smaller than a predefined abort criterion;
a readjustment of the values of the internal connection weights based on the deviation in case the deviation is not equal to or smaller than the predefined abort criterion in the check; and
a continuation of the calculation of the provisional predicted signal data.

18. An imaging device comprising:
a system for image reconstruction, the system having:
a reconstruction controller configured to check whether image data suffices predefined quality criteria;
an Artificial Neuronal Network (ANN) trained on providing an estimation for a solution of signal evolution equations configured to generate predicted signal data by accelerated forward transformation based on the image data when the image data does not suffice the predefined quality criteria; and
an image changing module configured to change the image data in a signal domain and/or an image domain based on the predicted signal data and raw data received from an imaging device, wherein the change of the image data comprises a calculation of a first cost value based on the predicted signal data and the raw data in the signal domain; an adaption of the predicted signal data based on the first cost value in the signal domain; and a reconstruction of the image data based on the adapted predicted signal data,
wherein the system is configured to recursively use the reconstruction controller, ANN, and image changing module until the image data suffices the predefined quality criteria.

* * * * *

UNITED STATES PATENT AND TRADEMARK OFFICE
CERTIFICATE OF CORRECTION

PATENT NO. : 11,354,829 B2
APPLICATION NO. : 16/695644
DATED : June 7, 2022
INVENTOR(S) : Stefan Popescu It is certified that error appears in the above-identified patent and that said Letters Patent is hereby corrected as shown below:

In the Claims (Claim 14; Line 5):
"The system of claim 4, wherein the image changing"
Should be replaced with:
"The system of claim 13, wherein the image changing"

(Claim 16; Line 16):
"The system of claim 4, further comprising:"
Should be replaced with:
"The system of claim 13, further comprising:"

Signed and Sealed this
Sixteenth Day of August, 2022

Katherine Kelly Vidal
*Director of the United States Patent and Trademark Office*